No. 11,741. Reissued May 16, 1899.

T. S. GARRISON.

BURIAL CASKET.

(Application filed Feb. 25, 1899.)

2 Sheets—Sheet 1.

Witnesses
M. C. Buck.
R D Hawkins

Inventor
Thomas S. Garrison
By V H Lockwood
His Attorney.

THE NORRIS PETERS CO., PHOTO-LITHO., WASHINGTON, D. C.

No. 11,741. Reissued May 16, 1899.

T. S. GARRISON.

BURIAL CASKET.

(Application filed Feb. 25, 1899.)

2 Sheets—Sheet 2.

Witnesses
M. C. Buck.
R D Hawkins

Inventor
Thomas S. Garrison
By V. H. Lockwood
His Attorney.

THE NORRIS PETERS CO., PHOTO-LITHO., WASHINGTON, D. C.

UNITED STATES PATENT OFFICE.

THOMAS S. GARRISON, OF INDIANAPOLIS, INDIANA, ASSIGNOR, BY MESNE ASSIGNMENTS, TO THE CASKET LID ADJUSTMENT COMPANY, OF SAME PLACE.

BURIAL-CASKET.

SPECIFICATION forming part of Reissued Letters Patent No. 11,741, dated May 16, 1899.

Original No. 601,037, dated March 22, 1898. Application for reissue filed February 25, 1899. Serial No. 706,880.

*To all whom it may concern:*

Be it known that I, THOMAS S. GARRISON, a citizen of the United States, residing at Indianapolis, in the county of Marion and State of Indiana, have invented certain new and useful Improvements in Burial-Caskets; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to that class of burial-caskets which have a detachable cover or lid; and it consists in certain novel devices which are applied to the casket and cover, whereby the cover is connected to the casket and permitting the cover to be drawn off horizontally and whereby the cover may be supported overhanging either side of the casket, as will be more fully described hereinafter and claimed.

When a corpse is laid out for viewing, it is desirable to attain a pleasing effect, which can seldom be done when a hinged cover is used, and if the cover is entirely detachable it must usually be placed where it proves an obstruction to viewers. Therefore it is my object to provide means whereby the detachable cover may be readily drawn off horizontally to either side, as may be most convenient, tilted over at an angle, so as to expose the under side, or allowed to hang down at the outside of the casket, the under side being hidden. These objects are attained in my invention, which may be cheaply constructed and is simple, durable, and economical in use.

Figure 1:
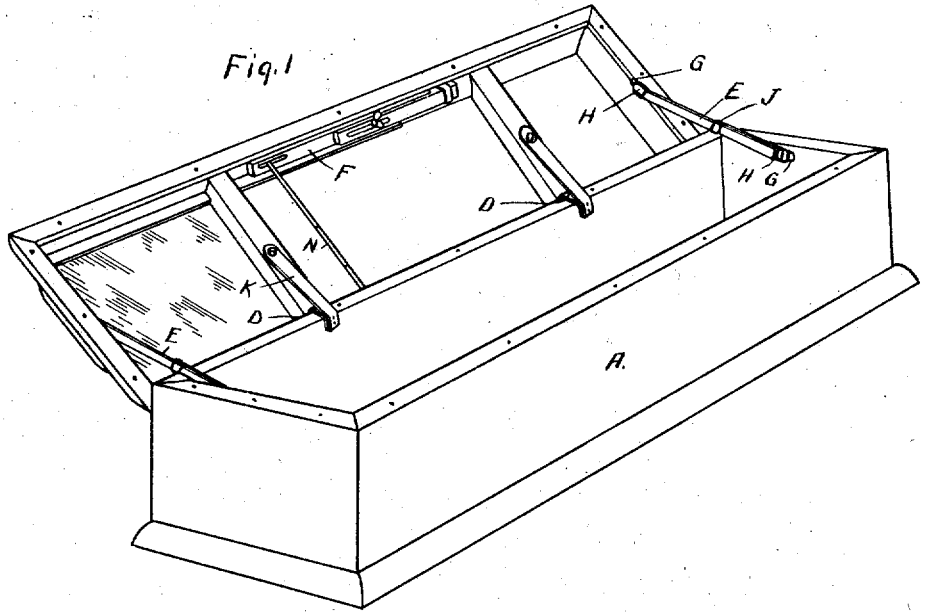
Figure 2:
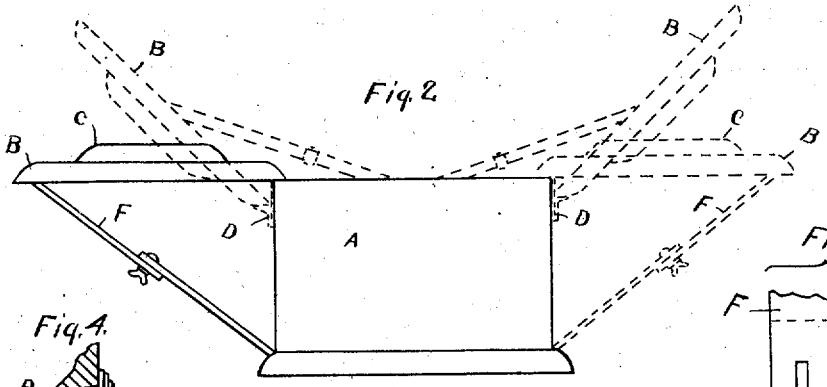
Figure 3:
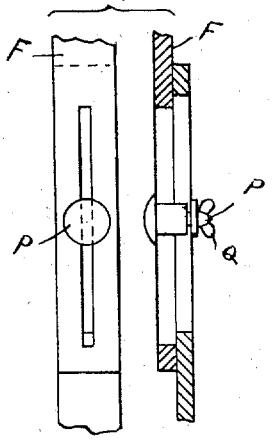
Figure 4:
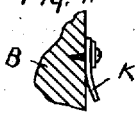
Figure 5:
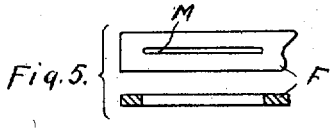
Figure 6:
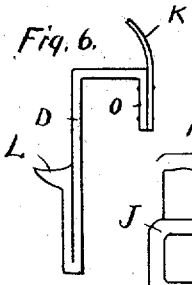
Figure 7:
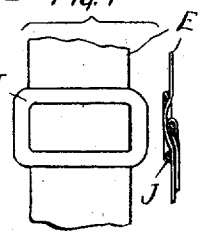
Figure 8:
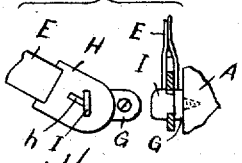
Figure 9:
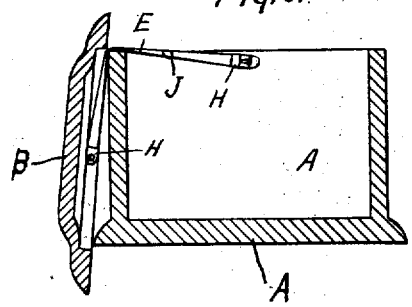
Figure 10:
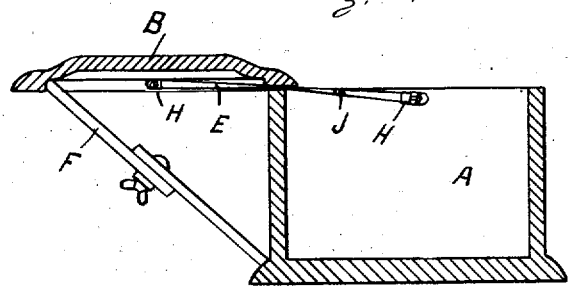
Figure 11:
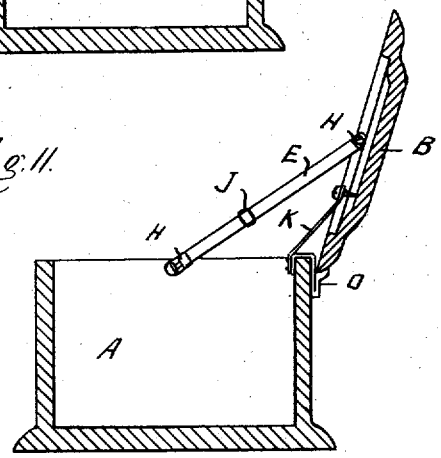

Referring to the drawings, Figure 1 represents a perspective view of a casket having a detachable cover and to which my devices are applied; Fig. 2, an end elevation showing two of the positions in which the cover may be placed and supported; and Figs. 3, 4, 5, 6, 7, and 8 are detail views of detached parts. Fig. 9 is a central cross-section of the casket with the lid suspended beside the casket. Fig. 10 is the same with the lid tilted. Fig. 11 is the same with the lid supported horizontally to one side of the casket.

In the drawings, A designates the casket, which may be of any suitable form and material; B, the cover, of the usual detachable type and provided with suitable means whereby to secure it finally to the casket; C, the cap upon the cover; D, the supporting-brackets; E, the connecting-strips; F, the supporting-leg, and G the cleat. The connections E are made of any suitable material, as silk woven into a flat tape or metal in the form of a chain, or it may be a braided cord, and each end is provided with an eye-plate H, and it is rendered adjustable lengthwise by means of a friction-buckle J, suitably applied, or other suitable means may be employed for this purpose. A cleat G is suitably secured at the inner side of each bend of both the casket and cover, and at the center thereof transversely it has a circular projecting stud provided with a T-head, over which the slot *h* may pass. At each end of the casket a connecting-strip is applied, one end being connected to the cleat in the casket and the opposite end to the cleat in the cover. After the length of the connecting-strip is adjusted to a casket further adjustment is not required. The plates H are adapted to move freely upon the stud and are retained by the T-head. Other suitable means by which the connecting-strips may be attached may be employed, so that they may be preferably detachable and permit the connecting-strip to shift to either side of the casket.

The supporting-brackets D are metallic and may be suitably covered with leather or fabric. Each is universal in its application to either side or either end of the casket. It comprises a vertical plate having its upper end turned over to form a hook adapted to hang upon the top edge of the casket side, and its lower end hangs down against the outside of the casket. It is provided with a projecting lip L, preferably above its lower end, upon which the cover B may be supported, as shown. Each bracket is provided with a strap K or cord of suitable length to reach from the side to the center of the cover, to which it is suitably secured so as to be readily detached. When not in use, the bracket is conveniently stowed in the folds of the interior trimmings, and they are thus always within reach when required.

The supporting-leg F is preferably made of wood in two parts, so as to be readily varied in length, the two parts being bound together by a suitable bolt P, passing through slots, and a thumb-nut Q. One end of the leg, designated as the "top," has a slot M or suitable aperture, through which I pass a cord N, both ends of which are suitably secured at either side of the cover B, so that the leg may slip over it to either side of the cover that it may be required to support it, as shown, the lower end resting against the bottom molding on the casket, or when none is used a suitable rosette may be attached as a support. The upper end of the leg is in contact with the under side of the cover, the inner ledge of which prevents its slipping out. The edge of the lid in such horizontal position is prevented from slipping off the edge of the casket by the connecting-strips E or any other means for holding such edge of the lid in place. When not in use, the leg may be conveniently stowed under the lid in a clip behind the trimming.

My devices are equally adapted to any of the forms of caskets or coffins having a detachable cover and are of great utility in preparing for an interment. When finally closing and sealing the casket, the connecting-strips, brackets, and legs may be detached and removed for subsequent use, if desired.

Having thus described my invention, what I claim as new, and desire to secure by Letters Patent, is—

1. A burial-casket provided with a detachable lid, and flexible strips centrally connecting the inner ends of the casket with the corresponding ends of the lid, said strips adapted to extend over the upper edge of the body and to suspend the lid by either side thereof.

2. A burial-casket provided with a detachable lid, strips connecting the inner ends of the casket with the corresponding ends of the lid, and means for a detachable connection between the edge of the casket and the edge of the lid when the lid is turned up on its edge.

3. A burial-casket provided with a detachable lid, strips connecting the inner ends of the casket with the corresponding ends of the lid, and detachable brackets that hook on the edge of the casket to support the lid when turned on its edge.

4. A burial-casket provided with a detachable cover having at each inner end a centrally-disposed pivotal cleat, a pivotal cleat secured centrally at each inner end of said casket, a flexible strip connecting said cleats on said cover and said casket at each end thereof and providing that said cover may be drawn horizontally and laterally from over said casket to overhang either side thereof within the limit of the length of said connecting-strips and retained thereby, and means by which the overhanging portion of said cover may be supported angularly, substantially as shown and described.

5. In a burial-casket, the combination of the casket provided with a cleat at each inside end thereof and secured in a transversely-central position, the cover provided with a cleat at each end inside thereof and secured in a transversely-central position, a flexible connecting-strip at each end of said casket having its two ends connected to said cleats whereby a flexible connection is provided between said casket and its cover, and the adjustable leg whereby the said cover may be supported when said casket is uncovered, substantially as shown and described.

6. In a burial-casket having a detachable cover, the combination of a flexible connecting-strip at each end of said casket, one end of each connecting-strip being pivotally secured at the inner side of the end of the casket at the transverse center thereof, and the opposite end of each connecting-strip being pivotally secured at the inner side of the adjacent end of the cover at the transverse center thereof, permitting said cover to be drawn horizontally from above said casket to either side thereof but limiting its movement, and the portable brackets providing a support for the lower edge of said cover, substantially as shown and described.

7. In a burial-casket, the combination of a detachable cover provided at the inner side of each end thereof with a central pivotal cleat, a pivotal cleat secured centrally at the inner side of each end of the casket, a flexible and longitudinally-adjustable connecting-strip at each end of said casket, one end of each connecting-strip being pivotally connected to the said cleat in the casket and the opposite end of each connecting-strip being pivotally connected to the said cleat in the cover, the portable brackets providing a support for the lower edge of said cover when tilted over the side of said casket, substantially as shown and described.

8. In a burial-casket having a detachable cover, the combination of a centrally-disposed cleat at each inner end of the casket, the centrally-disposed cleat at each inner end of the cover, a longitudinally-adjustable connecting-strip at each end of said casket connecting said cleats pivotally whereby said cover may be moved within the limits of the length of said connecting-strips over either side of said casket and retained in vertical positions, substantially as shown and described.

In testimony whereof I affix my signature in the presence of two witnesses.

THOMAS S. GARRISON.

Witnesses:
J. F. PHILLIPY,
GABRIEL PHILLIPY.